United States Patent Office 3,503,988
Patented Mar. 31, 1970

3,503,988
DERIVATIVES OF 5-CYANO-4-THIAZOLINE-$\Delta^{2,\alpha}$-ACETONITRILES
Real Laliberte, Laval, Quebec, Canada, assignor to American Home Products Corporation, New York, N.Y., a corporation of Delaware
No Drawing. Filed Dec. 13, 1967, Ser. No. 690,107
Int. Cl. C07d 91/26
U.S. Cl. 260—306.7                 7 Claims

ABSTRACT OF THE DISCLOSURE

Compounds characterized by antifungal and trichomonacidal activities of the formula

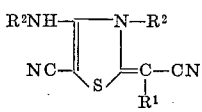

wherein $R^1$ is selected from the group which consists of lower-alkoxycarbonyl, lower-monoalkylaminocarbonyl, lower dialkylaminocarbonyl, 1-pyrrolidinylcarbonyl and anilinocarbonyl; and $R^2$ is selected from the group which consists of lower alkyl containing from one to two carbon atoms, allyl, phenyl, halo-substituted phenyl and nitro-substituted phenyl. These compounds are prepared by reacting a suitably substituted isothiocyanate with a suitably substituted methyl or ethyl cyanoacetate to obtain the correspondingly substituted 2-cyano-3-mercaptoacrylic acid methyl or ethyl ester as intermediate; and treating said latter intermediate with iodine in pyridine or triethylamine.

---

This invention relates to a new class of thiazolineacetonitrile derivatives particularly 5-cyano-4-thiazoline-$\Delta^{2,\alpha}$-acetonitrile derivatives and to a process for their preparation.

More specifically, this invention relates to 5-cyano-4-thiazoline-$\Delta^{2,\alpha}$-acetonitiriles of Formula I:

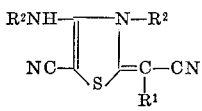

in which $R^1$ represents a lower-alkoxycarbonyl, for example, methoxycarbonyl or ethoxycarbonyl; a lower monoalkylamino carbonyl, for example, methylaminocarbonyl or ethylaminocarbonyl; a lower dialkylaminocarbonyl, for example, dimethylaminocarbonyl; the 1-pyrrolidinylcarbonyl; or the anilinocarbonyl group; $R^2$ represents a lower alkyl group containing from 1–2 carbon atoms, an allyl group, a phenyl group, or a halo- or nitro-substituted phenyl group, for example, the 4-chlorophenyl, 3,4-dichlorophenyl or 4-nitrophenyl group.

The thiazolineacetonitrile derivatives of this invention have antifungal activity and may be used as antifungal agents, especially against the pathogenic fungi *Trichophyton granulosum* and *Microsporum gypseum*. As antifungal agents, the compounds of this invention may be formulated in solutions, creams or lotions in pharmaceutically acceptable vehicles containing from 0.1 to 2.0 percent of the active ingredient and may be applied topically to the infected areas of the skin as required.

The compounds of this invention also possess trichomonacidal activity and are active against *Trichomonas foetus*. As trichomonacidal agents they may be formulated with suitable excipients in the form of vaginal inserts or creams containing from 5–50 percent of the active ingredient, and may be applied locally several times per day as required.

The thiazolineacetonitriles of this invention are prepared by a process illustrated by the following formulae in which $R^1$ and $R^2$ are as described above:

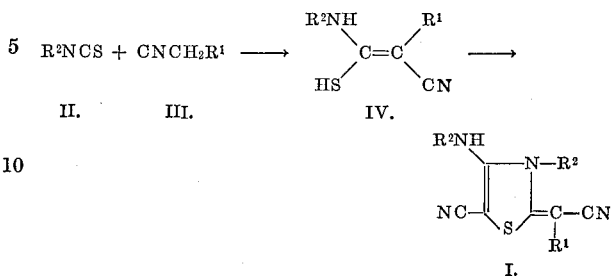

The starting materials of Formula III in which $R^1$ represents a lower monoalkylaminocarbonyl, a lower dialkylaminocarbonyl, a 1-pyrrolidinylcarbonyl or an anilinocarbonyl group may be readily prepared by condensing the commercially available methylcyanoacetate (III, $R^1=COOCH_3$) or ethyl cyanoacetate (III, $R^1=COOC_2H_5$)

with the appropriate amine according to the method of Naik and Bhat, Quart. J. Indian Chem. Soc., vol. 4, p. 547 (1927).

The starting materials of Formula III in which $R^1$ is as sodium ethoxide, according to the method of Ruheable isothiocyanate of Formula II, in which $R^2$ is defined as above in the presence of a basic condensing agent, for example, an alkali metal lower alkoxide such as sodium exthoxide, according to the method of Ruhemann described in J. Chem. Soc., vol. 93, p. 621 (1908), to yield the corresponding 3-arylamino or 3-alkylamino-2-substituted-3-mercaptoacrylonitrile derivatives of Formula IV.

The final step of this process involves an unusual cyclization reaction between two molecules of the mercaptoacrylonitrile derivative of Formula IV.

This cyclization may be accomplished by treating the mercaptoacrylonitrile derivatives of Formula IV with iodine in a basic solvent, such as pyridine or triethylamine. The reaction time and the reaction temperature are not critical but are chosen to give the best yields of the thiazoline-acetonitriles of Formula I. In practicing this invention I have found that excellent yields of the thiazoline - acetonitriles of this invention are obtained by heating the thioacrylonitriles of Formula IV with one equivalent of iodine in pyridine or triethylamine solution at a temperature ranging from 60° C. to the boiling point of the mixture for a period of time ranging from five minutes to one hour. The completion of this reaction may be detected by a Negative starch-iodine test. The thiazoline-acetronitriles of Formula I may then be isolated as a solid by diluting the reaction mixture with water or with dilute mineral acid and filtration, or by acidifying the reaction mixture with dilute mineral acid, extracting with an organic solvent, and evaporating the solvent. The resulting crude material is dissolved in a solvent which does not dissolve sulfur, preferably acetone, filtered from undissolved sulfur, and the desired product is purified by recrystallization.

The following examples will illustrate the scope of this invention.

EXAMPLE 1

To a cold solution of sodium ethoxide (0.1 mole of sodium in 50 ml. of ethanol), 0.1 mole of ethyl cyanoacetate is added. The solution is cooled and 0.1 mole of phenyl isothiocyanate is added. The mixture is cooled for three minutes and left at room temperature for one hour. It is then poured into 250 ml. of water and acidified in the cold with 50% hydrochloric acid. The precipitate is filtered off and crystallized from ethanol, to yield 3-anilino-2-cyano-3-mercaptoacrylic acid ethyl ester, M.P. 115–116° C., or the precipitate may be dried and then used for the preparation of 4-anilino-3-phenyl-5-cyano-α-(ethoxycarbonyl)-thiazoline-$\Delta^{2,\alpha}$-acetonitrile as described in Example 9.

EXAMPLE 2

Following the procedure of Example 1 but substituting an equivalent amount of methyl, ethyl, allyl, 3-nitrophenyl, 4-chlorophenyl or 3,4-dichlorophenyl isothiocyanate for phenyl isothiocyanate, the corresponding 3-(methylamino)-, M.P. 51 – 52° C. 3-(ethylamino)-, M.P., 68° C., 3-(allylamino)-, M.P. 45° C., 3-(3'-nitrophenylamino)-, 3-(4'-chlorophenylamino) and 3-(3',4'-dichlorophenylamino)-2-cyano - 3 - mercaptoacrylic acid ethyl esters are also obtained.

EXAMPLE 3

Following the procedure of Example 1 but substituting an equivalent amount of methyl cyanoacetate for ethyl cyanoacetate, 3-anilino-2-cyano-3-mercaptoacrylic acid methyl ester is obtained.

In the same manner, but using methyl, ethyl, allyl, 3-nitrophenyl, 4-chlorophenyl or 3,4-dichlorophenyl isothiocyanate instead of phenyl isothiocyanate, the corresponding 3-(methylamino)-, 3-(ethylamino)-, 3-(allylamino)-, 3-(3'nitrophenylamino)-, 3 - 4' - chlorophenylamino)-, and 3 - (3',4'-dichlorophenylamino)-2-cyano-3-mercaptoacrylic acid methyl esters are also obtained.

EXAMPLE 4

Following the procedure of Example 1 but substituting an equivalent amount of 2 - cyano-N-methylacetamide, Naik and Bhat, Quart. J. Indian Chem. Soc., vol. 4, p. 547 (1927), for ethyl cyanoacetate, 3-anilino-2-cyano-3-mercapto-N-methylacrylamide, M.P. 154–156° C. is obtained.

In the same manner, but using methyl, ethyl, allyl, 3-nitrophenyl, 4-chlorophenyl or 3,4-dichlorophenyl isothiocyanate instead of phenyl isothiocyanate, the corresponding 3-(methylamino)-, 3-(ethylamino)-, 3-(allylamino-, 3,3'-nitrophenylamino)-, 3 - (4' - chlorophenylamino)- and 3 - (3'4'-dichlorophenylamino)-2-cyano-3-mercapto-N-methylacrylamides are obtained.

EXAMPLE 5

Following the procedure of Example 1 but substituting an equivalent amount of 2-cyano-N-ethylacetamide, Naik and Bhat, Quart. J. Indian Chem. Soc., vol. 4, p. 547 (1927), for ethyl cyanoacetate, 3-anilino-2-cyano-3 - mercapto-N-ethylacrylamide is obtained.

In the same manner, but using methyl, ethyl, allyl, 3-nitrophenyl, 4-chlorophenyl, or 3,4-dichlorophenyl isothiocyanate instead of phenyl isothiocyanate, the corresponding 3 - (methylamino)-, 3-(ethylamino)-, 3-(allylamino)-, 3 - (3'-nitrophenylamino)-, 3-(4'-chlorophenylamino)- and 3-(3',4'-dichlorophenylamino)-2-cyano-3-mercapto-N-ethylacrylamides are obtained.

EXAMPLE 6

Following the procedure of Example 1 but substituting an equivalent amount of 2-cyano-N,N-dimethylacetamide, Eliel, J. Am. Chem. Soc., vol. 73, p. 43 (1951), for ethyl cyanoacetate, 3-anilino-2-cyano-3-mercapto-N,N-dimethyl-acrylamide is obtained.

In the same manner, but using methyl, ethyl, allyl, 3-nitrophenyl, 4-chlorophenyl, or 3,4-dichlorophenyl isothiocyanate instead of phenyl isothiocyanate the corresponding 3-(methylamino)-, 3-(ethylamino)-, 3-(allylamino)- 3 - (3' - nitrophenylamino)-, 3-(4'-chlorophenylamino)- and 3-(3',4'-dichlorophenylamino)-, 2-cyano-3-mercapto-N,N-dimethylacrylamides are obtained.

EXAMPLE 7

Following the procedure of Example 1 but substituting an equivalent amount of 1-(cyanoacetyl)pyrrolidine, U.S. Pat. No. 3,138,592, for ethyl cyanoacetate, 1-(3-anilino-2-cyano-3-mercaptoacrylyl)pyrroldine, M.P. 154–156° C. is obtained.

In the same manner, but using methyl, ethyl, allyl, 3-nitrophenyl, 4-chlorophenyl or 3,4-dichlorophenyl isothiocyanate instead of phenyl isothiocyanate, the corresponding 1-[3-(methylamino)-, 1-[3-(ethylamino)-, 1-[3 - (allylamino)-, 1-[3-(3'-nitrophenylamino)-, 1-[3-(4'-chlorophenylamino)- and 1 - [3 - (3',4'-dichlorophenylamino) - 2 - cyano - 3 - mercaptoacrylyl]pyrrolidines are obtained.

EXAMPLE 8

Following the procedure of Example 1 but substituting an equivalent amount of 2-cyanoacetanilide, Naik and Bhat, Quart. J. Indian Chem. Soc., vol. 4, p. 547 (1927), for ethyl cyanoacetate, 3-anilino-2-cyano - 3 - mercaptoacrylanilide, M.P. 111–113° C. is obtained.

In the same manner, but using methyl, ethyl, allyl, 3-nitrophenyl, 4-chlorophenyl or 3,4 - dichlorophenylisothiocyanate instead of phenyl isothiocyanate, the corresponding 3-(methylamino)-, 3-(ethylamino)-, 3-(allylamino)-, 3-(3'-nitrophenylamino)-, 3-(4' - chlorophenylamino)- and 3-(3',4'-dichlorophenylamino)-2-cyano - 3-mercaptoacrylanilides are obtained.

EXAMPLE 9

A 10% solution of equimolar quantities of 3-anilino-2-cyano-3-mercaptoacrylanilide and iodine are refluxed in pyridine or triethylamine for 15 minutes. The reaction mixture is cooled, poured onto ice and rendered acidic (pH 2) with hydrochloric acid-water (1:1). The resulting precipitate is either filtered or extracted with ethyl acetate which is subsequently evaporated. The solid obtained is dissolved in cold acetone, filtered to remove the free sulfur, and concentrated to a solid which is recrystallized from ethyl acetate and acrylonitrile to yield 4-anilino-3-phenyl-5-cyano-α-(anilinocarbonyl) - thiazoline-$\Delta^{2,\alpha}$-acetonitrile, M.P. 294° C.

In the same manner, but using 3-anilino-3-(methylamino)-, 3-(ethylamino)-, 3-(allylamino)-, 3-(3 - nitrophenylamino)-, 3-(4'-chlorophenylamino)-, or 3-(3',4'-dichlorophenylamino) - 2 - cyano - 3 - mercaptoacrylic acid ethyl ester, instead of 3-anilino - 2 - cyano - 3-mercaptoacrylanilide, the corresponding 4-anilino - 3-phenyl- (M.P. 213° C.), 3-methyl-4-methylamino-, M.P. 271° C., 3-ethyl-4-ethylamino- (M.P. 198° C.), 3-allyl-4-allylamino-, 3-(3'-nitrophenyl) - 4 - (3' - nitrophenylamino)-, 3-(4'-chlorophenyl)-4-(4'-chlorophenylamino)-, and 3-(3',4'-dichlorophenyl)-4 - (3',4' - dichlorophenylamino)-5-cyano-α-(ethoxycarbonyl) - thiazoline - $\Delta^{2,\alpha}$-acetonitrile, M.P. 265–266° C. are also obtained.

In the same manner, but using 3-anilino-, 3-(methylamino)-, 3-(ethylamino)-, 3-(allylamino)-, 3-(3'-nitrophenylamino)-, 3-(4'-chlorophenylamino)- or 3 - (3',4'-dichlorophenylamino)-2-cyano - 3 - mercaptoacrylic acid methyl ester, instead of 3-anilino-2-cyano - 3 - mercaptoacrylanilide, the corresponding 4-anilino - 3 - phenyl-, 3-methyl-4-methylamino-, 3-ethyl-4-ethylamino-, 3-allyl-4-allylamino-, 3-(3'-nitrophenyl)-4-(3'-nitrophenylamino)-, 3-(4'-chlorophenyl)-4-(4'-chlorophenylamino)-, 3 - (3',4'-dichlorophenyl)-4-(3',4' - dichlorophenylamino)-5-cyano-α-(methoxycarbonyl)-thiazoline-$\Delta^{2,\alpha}$-acetonitriles are also obtained.

In the same manner, but using 3-anilino-, 3-(methylamino)-, 3-(ethylamino)-, 3-(allylamino)-, 3-(3'-nitrophenylamino)-, 3-(4'-chlorophenylamino)- or 3 - (3',4'-dichlorophenylamino-2-cyano-3-mercapto - N - methylacrylamide instead of 3-anilino-2-cyano - 3 - mercaptoacrylanilide, the corresponding 4-anilino-3-phenyl-, 3-methyl-4-methylamino-, 3-ethyl-4-ethylamino-, 3-allyl-4-allylamino-, 3-(3'-nitrophenyl)-4-(3'-nitrophenylamino)-, 3-(4'-chlorophenyl)-4-(4'-chlorophenylamino)-, 3-(3',4'-dichlorophenyl)-4-(3',4'-dichlorophenylamino)-5 - cyano-α-(methylaminocarbonyl)-thiazoline-Δ$^{2,α}$-acetonitriles are obtained.

In the same manner, but using 3-anilino-, 3-(methylamino)-, 3-(ethylamino)-, 3-(allylamino)-, 3-(3'-nitrophenylamino)-, 3-(4'-chlorophenylamino)- or 3-(3',4'-dichlorophenylamino)-2-cyano-3-mercapto - N - ethylacryl amide instead of 3-anilino-2-cyano - 3 - mercaptoacrylanilide, the corresponding 4-anilino-3-phenyl-, 3-methyl-4-methylamino-, 3-ethyl-4-ethylamino-, 3-allyl - 4 - allylamino-, 3,(3'-nitrophenyl)-4 - (3' - nitrophenylamino)-, 3-(4'-chlorophenyl)-4-(4'-chlorophenylamino)-, 3-(3',4'-dichlorophenyl)-4-(3',4'-dichlorophenylamino)-5 - cyano-α-(ethylaminocarbonyl)-thiazoline-Δ$^{2,α}$ - acetonitriles are obtained.

In the same manner, but using 3-anilino-, 3-(methylamino)-, 3-(ethylamino)-, 3-(allylamino)-, 3-(3' - nitrophenylamino)-, 3-(4'-chlorophenylamino)- or 3-(3',4'-dichlorophenylamino)-2-cyano-3-mercapto-N,N - dimethylacrylamide instead of 3-anilino-2-cyano - 3 - mercaptoacrylanilide, the corresponding 4-anilino-3-phenyl-, 3-methyl-4-methylamino-, 3-ethyl-4-ethylamino-, 3-allyl-4-allylamino-, 3-(3'-nitrophenyl)-4-(3'-nitrophenylamino)-, 3-(4'-chlorophenyl)-4-(4'-chlorophenylamino)-, 3-(3',4'-dichlorophenyl)-4-(3',4'-dichlorophenylamino)-5 - cyano-α-(dimethylaminocarbonyl)-thiazoline-Δ$^{2,α}$ - acetonitriles are obtained.

In the same manner, but using 1-[3-anilino-, 1-[3-(methylamino)-, 1-[3-(ethylamino)-, 1-[3-(allylamino)-, 1-[3-(3'-nitrophenylamino)-, 1-[3 - (4' - chlorophenylamino)- or 1-[3-(3',4'-dichlorophenylamino)-2-cyano-3-mercaptoacrylyl]pyrrolidines instead of 3 - anilino - 2-cyano - 3 - mercaptoacrylanilide, the corresponding 4-anilino-3-phenyl-, 3-methyl-4-methylamino-, 3-ethyl - 4 - ethylamino-, 3-allyl-4-allylamino, 3-(3'-nitrophenyl) - 4 - (3'-nitrophenylamino)-, 3-(4'-chlorophenyl) - 4 - (4'-chlorophenylamino)-, 3-(3',4'-dichlorophenyl)-4 - (3',4'-dichlorophenylamino)-5 - cyano - α - (1 - pyrrolidinylcarbonyl)-thiazoline-Δ$^{2,α}$-acetonitriles are obtained.

In the same manner, but using 3-(methylamino)-, 3-(ethylamino)-, 3-(allylamino)-, 3-(3'-nitrophenylamino)-, 3-(4'-chlorophenylamino)- or 3-(3',4' - dichlorophenylamino)-2-cyano-3-mercaptoacrylanilide instead of 3-anilino-2-cyano-3-mercaptoacrylanilide, the corresponding 3-methyl - 4 - methylamino-, 3-ethyl-4-ethylamino-, 3-allyl-4-allylamino-, 3 - (3'-nitrophenyl)-4-(3'-nitrophenylamino)-, 3-(4'-chlorophenyl) - 4 - (4'-chlorophenylamino)-, 3 - (3',4' - dichlorophenyl)-4-(3',4'-dichlorophenylamino)-α-(anilinocarbonyl)-5-cyano-Δ$^{2,α}$-acetonitriles are obtained.

I claim:
1. Compounds of the formula

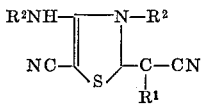

wherein R$^1$ is selected from the group which consists of lower - alkoxycarbonyl, lower - monoalkylaminocarbonyl, lower dialkylaminocarbonyl, 1-pyrrolidinylcarbonyl, and anilinocarbonyl; and R$^2$ is selected from the group which consists of lower alkyl, allyl, phenyl, halo-substituted phenyl and nitro-substituted phenyl.

2. 4 - anilino-3-phenyl - 5 - cyano-α-(anilinocarbonyl)-thiazoline-Δ$^{2,α}$-acetonitrile, as claimed in claim 1.

3. 4-anilino - 3 - phenyl-5-cyano-α-(ethoxycarbonyl)-thiazoline-Δ$^{2,α}$-acetonitrile, as claimed in claim 1.

4. 3-methyl - 4 - methylamino - 5 - cyano-α-(ethoxycarbonyl)-thiazoline-Δ$^{2,α}$-acetonitrile, as claimed in claim 1.

5. 3-ethyl - 4 - ethylamino-5-cyano-α-(ethoxycarbonyl)-thiazoline-Δ$^{2,α}$-acetonitrile, as claimed in claim 1.

6. 3-(3',4'-dichlorophenyl) - 4 - (3',4'-dichlorophenylamino) - 5 - cyano - α - (ethoxycarbonyl)-thiazoline-Δ$^{2,α}$-acetonitrile, as claimed in claim 1.

7. The process of preparing a compound of the formula

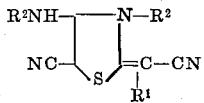

wherein R$^1$ is selected from the group which consists of lower alkoxycarbonyl, lower monoalkylaminocarbonyl, lower dialkylaminocarbonyl, 1-pyrrolidinylcarbonyl, and anilinocarbonyl; and R$^2$ is selected from the group which consists of lower alkyl containing from one to two carbon atoms, allyl, phenyl, halo-substituted phenyl and nitro-substituted phenyl, which comprises cyclizing two molecules of a compound of the formula

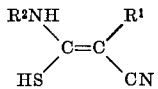

wherein R$^1$ and R$^2$ are as above defined, said cyclization, wherein two molar amounts of said compound undergo reaction with each other, being carried out in the presence of iodine, and in a basic solvent selected from the group which consists of pyridine and triethylamine at a temperature within the range 60° C. to the boiling point of said mixture.

References Cited

UNITED STATES PATENTS 3,379,779   4/1968   Strobel et al. _____ 260—306.7

ALEX MAZEL, Primary Examiner

R. J. GALLAGHER, Assistant Examiner

U.S. Cl. X.R.

260—326.5, 465, 465.4; 424—270